United States Patent [19]

Gött et al.

[11] 4,249,841
[45] Feb. 10, 1981

[54] WIRE PICKING FROM A WIRE BUNDLE

[75] Inventors: Hans Gött; Josef Ritter; Klaus Ritter; Gerhard Ritter; Gerhard Schmidt, all of Graz, Austria

[73] Assignee: EvG Entwicklungs-u. verwertungs-GmbH, Graz, Austria

[21] Appl. No.: 967,406

[22] Filed: Dec. 7, 1978

[30] Foreign Application Priority Data

Dec. 13, 1977 [AT] Austria ................. 8902/77

[51] Int. Cl.³ .................. B21F 23/00; B65G 59/06
[52] U.S. Cl. ........................ 414/14; 140/112; 221/179; 221/218; 221/220; 221/238; 414/115; 414/128; 414/745; 414/786
[58] Field of Search ............ 414/14, 16, 17, 113, 414/115, 128, 677, 745, 748, 786, 787; 221/181, 179, 183, 203, 217, 218, 220, 233, 238; 51/215 R, 215 H; 140/112

[56] References Cited

U.S. PATENT DOCUMENTS

| | | | |
|---|---|---|---|
| 2,380,450 | 4/1945 | Klopfer | 221/203 |
| 2,896,379 | 7/1959 | Hermann | 414/745 X |
| 3,491,900 | 1/1970 | Pinnolis et al. | 414/748 |

FOREIGN PATENT DOCUMENTS

| | | | |
|---|---|---|---|
| 1014935 | 8/1957 | Fed. Rep. of Germany | 414/748 |
| 1161529 | 1/1964 | Fed. Rep. of Germany | 140/112 |
| 1191897 | 4/1959 | France | 414/748 |
| 389793 | 1/1933 | United Kingdom | 221/203 |

Primary Examiner—Leslie J. Paperner
Attorney, Agent, or Firm—Ernest F. Marmorek

[57] ABSTRACT

Wires are picked from a loose bundle of wires which have been cut to length, prior to feeding to a processing machine such as a grid welding machine. The bundle is laid on a supporting table (23) so that end parts of the wires project freely beyond the table. A lifting beam (18) having a vertical slot (19) is then raised beneath the projecting end parts of the wires so that most of the wires are raised but the others are received one above the other in the slot. A gripper having clamping cheeks (20) is applied from below and grips the lowermost wire in the slot. The gripper is mounted on a carrier (2) which is movable parallel to the wire axes to pull the gripped wire longitudinally out of the slot.

13 Claims, 5 Drawing Figures

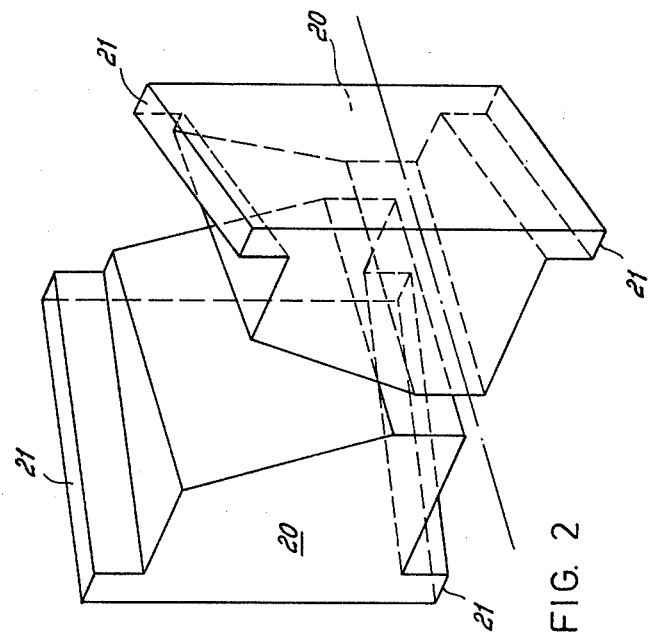
FIG. 2
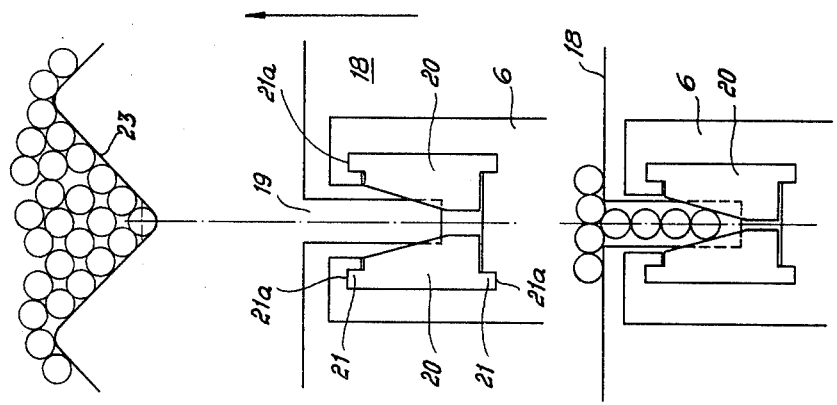
FIG. 3
FIG. 4

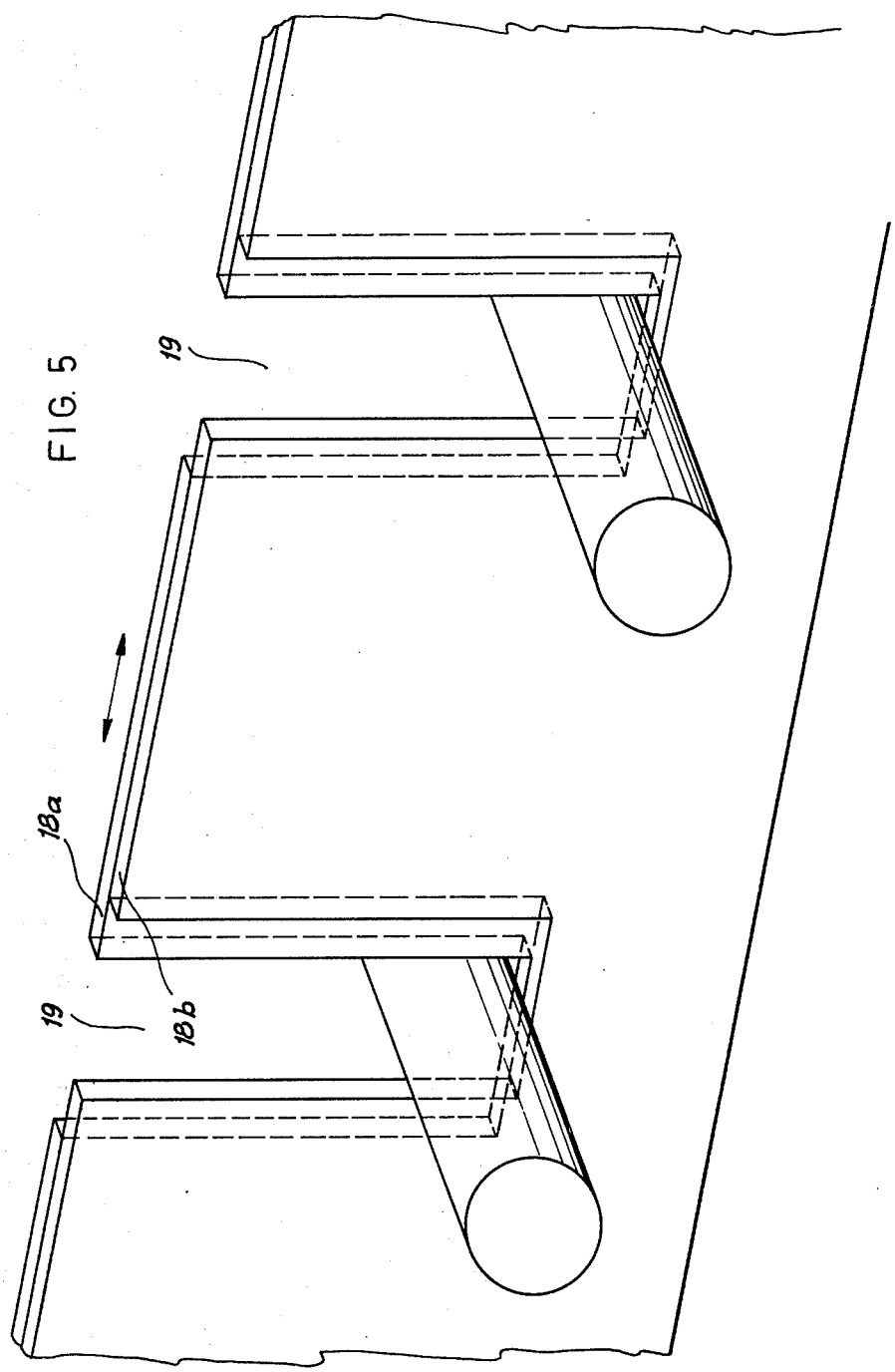

WIRE PICKING FROM A WIRE BUNDLE

BACKGROUND OF THE INVENTION

For the feed of longitudinal wires cut to length to a processing machine, such as a grid welding machine, a mechanism is known having arranged in alignment side by side a plurality of grippers, which can be lowered and raised and also displaced in the direction of feed of the longitudinal wires, and each of which seize from above one single wire out of a loose bundle of wires, i.e., out of a stock of wires already lying without arrangement on a supporting table and introduce the gripped wires into the grid welding machine in parallel with one another and spaced apart (cf.DAS No. 1452974).

In the case of this known mechanism the gripper cheeks must, during the lowering motion of the grippers, be pushed into the wire stock while open in order upon their succeeding closing motion to be able to seize one single wire and lift it up out of the wire stock. Then the grippers with the wires clamped firmly between their cheeks are moved towards the welding machine, whereupon the wires get pulled in their longitudinal direction out of the wire stock.

In the case of this mechanism the pushing of the open gripper cheeks into the unyieldingly supported wire stock is difficult especially since the thickly packed wires can hardly be deflected sideways. The closing of the gripper cheeks pushed into the wire stock is likewise difficult and having regard to the thickly packed wire stock is only possible at all if the grippers are raised again simultaneously with the closing motion. Moreover it has to be taken into consideration that the weight of the wire seized, the weight of further wires perhaps still pressing heavily on it in the disorderly wire stock and also the gripper cheeks themselves cause components of force directed downwards against the wire seized, which promote slipping of the wire seized out of the gripper cheeks. The known mechanism is consequently unreliable in operation.

SUMMARY OF THE INVENTION

The invention is therefore concerned with the problem of picking out wires from a loose bundle, by pulling the wires out of the bundle by means of a gripper in such a way that optimum operating conditions are achieved for the gripper and thus its reliability in operation is increased.

In accordance with the invention, in a method of picking out wires from a loose bundle of wire which have been cut to length, the loose bundle of wires is laid upon a supporting surface in such a way that end parts of the wires project freely beyond the supporting surface, the end parts of the majority of the wires are raised relatively to the end parts of the remaining wires which, simultaneously, become arranged in a vertical plane one above the other, and the end part of the lowermost one of the wires in the vertical plane is seized between the two upwardly diverging damp faces of a gripper by which the lowermost wire is then drawn longitudinally out of the bundle.

With this method, the gripper cheeks upon seizing a wire are not impeded by other wires in the wire stock, and again the downwards acting forces originating in the dead weight of the wire seized and of the weight of any other wires still pressing heavily on it, no longer have the tendency to force the seized wire out of the gripper cheeks because the effective clamping faces actually converge downwards.

The method in accordance with the invention can be applied for the wire feed to any processing machine, e.g., a grid welding machine.

In a preferred technique, the clamp faces are pushed from below against the lowermost wire and are urged resiliently to move together along converging paths extending generally parallel to the longitudinal axes of the wires in the bundle. The closing of the gripper cheeks against the wire seized is then effected resiliently. This procedure in particular enables a number of grippers to be actuated together for simultaneous picking out of a number of wires without their interfering with one another because of differences in position or thickness of the wires seized.

The invention also includes a mechanism for carrying out the new method, the mechanism comprising a supporting table on which a loose bundle of wires can be laid with their end parts projecting beyond an end of the table; a lifting beam which is raised from below against the projecting end parts of the wires and which has a vertical slot to receive the end parts of same of the wires in a vertical plane; a gripper having a pair of clamp cheeks which are raised from below, which diverge upwardly and which are aligned with the slot for gripping the end part of the lowermost wire in the slot; and a conveyor for longitudinal conveyance of a wire gripped by the gripper.

Preferably the clamp cheeks are raised simultaneously with the lifting beam.

In one construction, a carrier for the two clamp cheeks has converging guideways along which the two clamp cheeks can be moved together and towards the lowermost wire by means of a drive connected resiliently to the clamp cheeks via a force-transmitting spring. This construction is suitable in particular for feed of longitudinal wires to a grid welding machine in which case a number of grippers must be used and actuated simultaneously in order to convey a plurality of parallel longitudinal wires from the wire stock to the welding machine.

There may be a limit-switch which is actuated if the gripper clamp cheeks move to an end position indicating an absence of a wire to be gripped in the slot. In this way, for example, in the previously mentioned application with grid welding machines it may be ensured that the actuation of all of the grippers is repeated if, exceptionally, one of them at the first attempt was not able to seize a wire so that a complete set of wires was not fed to the machine.

The carrier of the clamp cheeks may be arranged on a carriage which can travel along a rail away from the supporting table, and an end of the rail adjacent to the supporting table can be raised together with the lifting beam and the clamp cheeks.

The lifting beam preferably consists of two slotted beam-parts which overlap one another and which, for the purpose of alteration of the width of the slot can be displaced with respect to one another, so that the mechanism may be adjusted to different diameters of wire.

A particularly important field of application of the invention is the already mentioned longitudinal wire feed to grid welding machines.

BRIEF DESCRIPTION OF THE DRAWINGS

An example of a wire feed mechanism for this purpose will now be described in greater detail with reference to the accompanying diagrammatic drawings, in which:

FIG. 2 is an elevation of the gripper cheeks in perspective;

FIG. 3 is a front elevation of the gripper cheeks in the open position of rest underneath the wire stock already lying on the supporting table;

FIG. 4 is a further elevation of the gripper cheeks but in the raised closed operating position; and, FIG. 5 is a perspective view of the lifting beam.

DESCRIPTION OF THE PREFERRED EMBODIMENTS

Figure 1:
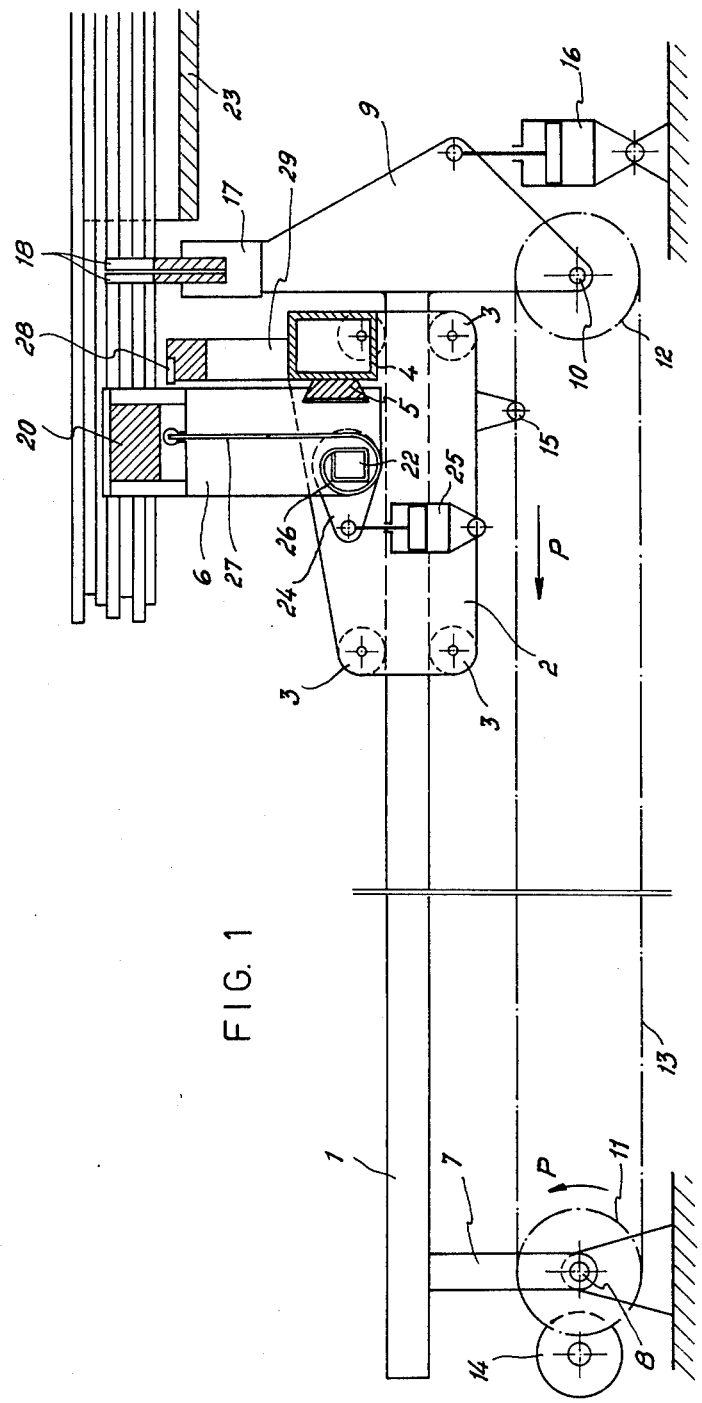
FIG. 1 is a diagrammatic side elevation, partially in section, of the mechanism.

On each of opposite sides of the width of a grid welding machine is arranged a rail 1 along which a bearer plate 2 can travel on rollers 3 in the direction of feed of the longitudinal wires to the grid welding machine.

Between the two bearer plates 2 runs transversely to the direction of feed of the longitudinal wires a carrier beam 4, along which is provided a slide guide 5 made in the shape of a dovetail. Along this slide guide 5 are arranged carrier bodies 6 for the grippers, which can be displaced and fixed. In this way it is possible to adapt the arrangement of the grippers to the distribution of the longitudinal wires required at the time in the grid to be produced.

Each of the two rails 1 rests at its front end on a support 7 which is carried so as to be able to pivot about a shaft 8 running in parallel with the carrier beam 4. At the rear end of each rail 1 is fitted an approximately triangular plate 9. The two plates 9 are connected together by a further shaft 10 parallel with the shaft 8.

The two shafts 8 and 10 are freely rotatable with respect to the supports 7 or the plates 9 and carry near their two ends sprockets 11, 12 which are connected together by endless chains 13. The sprockets 11, 12 are keyed to and rotable with the supporting shafts 8 and 10 respectively. The shaft 8 is driven via a gearwheel (not shown) from a motor-driven pinion 14.

Each of the two chains 13 is connected by a shackle 15 to one of the two carrier plates 2 associated with them, so that upon movement of the chains 13 the two carrier plates 2 are displaced along the rails 1.

The piston rod of an operating cylinder 16 engages with each plate 9 close to one corner of it and is thereby enabled to pivot the rails 1 and all of the parts connected to them about the shaft 8.

The plates 9 carry in addition near their top corners a guide 17 for two beam-parts 18a, 18b, (cf. FIG. 5) of a lifting beam 18, which can be adjusted and fixed in the guide relatively to one another and in which are provided at mutual spacings which correspond with the smallest distribution of the longitudinal wires, guide slots 19 for receiving a number of wires one above the other.

In each carrier body 6 at the same level as the guide slots 19 a pair of cooperating clamp cheeks 20 is provided, the co-operating clamp faces of which are made in accordance with FIG. 4 in such a way that their lines of intersection with vertical planes running in parallel with the carrier beam converge downwards at an acute angle, whilst their lines of intersection with horizontal planes run in parallel with the axes of the wires to be seized by them.

Each clamp cheek 20 furthermore exhibits guide fillets 21 arranged at a distance from its clamp face, standing up from its top and bottom faces. These guide fillets 21 are guided slidingly in corresponding recesses 21a in the carrier bodies 6, which converge at an acute angle towards the wire stock and allow movement of the clamp cheeks 20 relatively to the carrier body 6 both in the direction away from the wire stock, in which case the two clamp cheeks 20 move simultaneously away from one another, and in the direction towards the wire stock, in which case an approach of the two clamp cheeks 20 is effected simultaneously. If no wire is seized by two cooperating clamp cheeks, then the approach of these two clamp cheeks in the case of their movement in the direction towards the wire stock may be continued until two vertical faces of the clamp cheeks connected with the clamp faces at the bottom, touch one another. As soon as this contact occurs, the clamp cheeks have reached that position in which they are nearest to the supporting table 23 for the wire stock.

In order to be able to impart to all of the cooperating clamp cheeks of the individual grippers simultaneously an opening or respectively closing movement, a shaft 22 is provided, which may be pivoted by the piston rod of an operating cylinder 25 by means of a lever arm 24 connected fixedly in rotation to the shaft 22. The shaft 22 passes through all of the carrier bodies 6 in a freely rotatable manner, so that the carrier bodies may be displaced at option along the shaft 22.

Inside each carrier body is arranged a spiral spring 26 which is made likewise displaceable along the shaft 22, but is connected fixedly in rotation to the shaft 22. By means of a spring tongue 27 each spiral spring 26 is connected to the two cooperating clamp cheeks 20 of a gripper associated with it and can thus, depending upon the direction in which the shaft 22 is pivoted by the operating cylinder 25, exert upon the clamp cheeks a force in the sense of an approach or a separation of the clamp cheeks from one another by moving the clamp cheeks either in the direction towards the supporting table 23 or in the direction away from it. By means of this device, therefore, all of the pairs of clamp cheeks may be applied simultaneously against the wires to be seized by them or released from these wires again.

A limit switch 28 is associated with each pair of clamp cheeks, which is actuated if the pair of clamp cheeks in question has for any reason whatever not seized a wire. The limit switches may be arranged, e.g., on a beam 29 running in parallel with the carrier bea 4. Shortly before the pair of clamp cheeks in question reaches its already explained end position lying nearest to the supporting table 23, it strikes against this limit switch and sets it in action.

The method of operation of the mechanism is as follows:

In the state of rest the piston in the operating cylinder 16 is in its lowermost position and the upper edges of the lifting beam 18 and the pairs of clamp cheeks 20 are lying lower than the lowermost wire of the wire stock, and the supporting table 23 in accordance with FIG. 3 is composed preferably of a plurality of faces arranged at an angle to one another and inclined with respect to the guide slots 19 in the lifting beam 18 in order, as long as there are wires on it, to make these roll into the region above the guide slots 19.

In this position, by the grid advance mechanism of the grid welding machine, wires from the wire stock can be conveyed over and past the lifting beam 18 and the clamp cheeks 20 into the grid welding machine.

As soon as one batch of longitudinal wires has been processed to their full length in the grid welding machine and a new batch of wires is to be introduced into the grid welding machine, the operating cylinder 16 is acted upon by a pressure medium and the plate 9 is thereby raised by pivoting of the rail 1 about the shaft 8.

By this movement the lifting beam 18 and the clamp cheeks 20 arrive in the region of the wires projecting beyond the front end of the supporting table 23 and raise them. Those wires which are lying directly above a guide slot 19 in the lifting beam 18 enter the guide slot 19 and then arrive between the clamp faces of the clamp cheeks 20 associated with the guide slot 19 in question, so that as already mentioned a number of wires find room one above the other in each guide slot.

Now the operating cylinder 25 is acted upon by a pressure medium in the direction such that the shaft 22 is pivoted in FIG. 1 clockwise, whereby the spiral spring 26 is stressed and by means of the spring tongue 27 the clamp cheeks 20 are displaced towards the supporting table 23, so that they are moved simultaneously together.

During this movement the clamp cheeks 20 because of the already mentioned form of their clamp faces, converging downwards at an acute angle, come into contact in each case only with the lowermost of the wires resting between them in a guide slot 19. As soon as a pair of clamp cheeks has seized such a wire it cannot move any further towards the supporting table 23 and therefore comes to rest with the clamp cheeks lying against the wire. During further rotation of the shaft 22, the spiral spring 26 and the spring tongue 27 of a pair of clamp cheeks which has already seized a wire, merely become further stressed.

But if a pair of clamp cheeks has not seized a wire because no wire has arrived in the guide slot 19 associated with it, then it moves on further towards the right until it strikes against the associated limit switch 28.

The actuation of one of the limit switches first of all brings about an action upon the operating cylinder 25 by a pressure medium in the opposite direction so that only one rotary motion of the shaft 22 anticlockwise, which opens all of the clamp cheeks again, is effected and directly afterwards a venting of the operating cylinder 16 and hence a lowering of all of the parts into their position of rest in which the upper edges of the lifting beam 18 and the clamp cheeks 20 are lying again underneath the wire stock. Immediately subsequent to this motion a fresh raising of the grippers into the operation position is effected and a fresh closing movement of the clamp cheeks. This sequence of movement like all of the other cyles of movement too is controlled fully automatically by a device which is not the object of the invention and therefore does not need to be described more accurately here; it is where necessary repeated until all of the clamp cheeks have seized a wire.

As soon as this has happened, the motor driving the pinion 14 is set in action and hence the sprockets 11 are set in rotation in the direction of the arrow P. The chains 13 now move the carrier plates 2 and all of the parts connected with them and in particular also the carrier bodies 6 carrying the clamp cheeks in the direction towards the welding machine, while the clamp cheeks take with them the wires they have seized. As soon as the front ends of the wires seized have been introduced into the welding machine, the clamp cheeks are opened again, all of the parts and lowered into their position of rest and the carrier plates 2 are run back again into their starting position near the front end of the supporting table 23.

We claim:

1. In a method of selecting and transporting wires from a loose bundle of cut wires with the aid of a supporting surface for the cut wires, and free from any rotation means, the steps comprising:
   (a) placing said loose bundle of wires on said supporting surface, so that end parts of said wires project freely therebeyond,
   (b) raising the end parts of a majority of said wires with respect to the remaining end parts thereof,
   (c) simultaneously with the raising step arranging the remaining end parts of said wires one above the other in a substantially vertical plane,
   (d) gripping the end part of the lowermost wire in said substantially vertical plane, and
   (e) withdrawing the gripped wire from said loose bundle of wires substantially along its longitudinal direction.

2. In a method as claimed in claim 1, further comprising the step of lowering the end parts of the wires protruding freely beyond said supporting surface following step (e).

3. In a method as claimed in claim 1, wherein said gripping step is performed with the aid of a gripper including two outwardly converging clamp faces and further includes the step of urging said clamp faces to move towards one another along converging paths defining a center line said center line extending generally parallel to the longitudinal axis of said wires.

4. In a method as claimed in claim 3, wherein the gripping step is performed in a resilient manner.

5. An apparatus for separating wires from a loose bundle of cut wires,
   comprising in combination:
   support means for receiving said wires so that end parts of sid wires project beyond said support means,
   lifting means arranged to be moved upwardly towards said wires, and defining a slot extending in a substantially vertical direction for receiving the end parts of some of said wires projecting beyond said support means,
   gripping means free of any rotation means, and including a pair of outwardly diverging clamp faces aligned with said slot for gripping the end part of the lowermost of the wires received in said slot, and
   conveyor means for transporting the wire gripped by said gripping means in a direction generally parallel to the longitudinal direction of said wires.

6. An apparatus as claimed in claim 5, further comprising raising means for moving said clamp faces and said lifting means simultaneously upwardly.

7. An apparatus as claimed in claim 5, wherein said gripping means comprises carrier means including converging guideways, said clamp faces being movable along said guideways between a first position remote from the lowermost of said wires and a second position gripping the lowermost of said wires, and further comprising resilient means connected to said clamp faces adapted to be driven by drive means, so as to move said clamp faces.

8. An apparatus as claimed in claim 7, further comprising guide rails extending from a location near said support means away therefrom, a carriage arranged to travel on said guide rails, said carrier means being disposed on said carriage, and raising means for moving said clamp faces, said lifting means, and an end portion of said guide rails near said support means upwardly.

9. An apparatus as claimed in claim 5, wherein, in the absence of the lowermost of said wires being received in said slot, said clamp faces are movable along said guideways to a third position, and further comprising a limit switch actuatable by said clamp faces in said third position.

10. An apparatus as claimed in claim 5, wherein said lifting means includes two plates, each having a slot, the plates at least partially overlapping one another, so as to define a through-going slot, said plates being displaceable with respect to one another so as to adjust the width of said through-going slot.

11. An apparatus as claimed in claim 5, wherein said bundle of wires includes a multiplicity of wires, and further comprising a plurality of said pairs of clamp faces, and wherein said lifting means defines a plurality of said slots, said plurality of said pairs of clamp faces and said plurality of slots plus one corresponding to said multiplicity of wires, respectively, said raising means being arranged to move said lifting means and all of said clamp faces jointly in an upward direction, and all of said clamp faces being movable by said conveyor means in a direction away from said support means.

12. An apparatus as claimed in claim 11, further comprising a carrier beam extending substantially across the entire width of the apparatus, and wherein said gripping means comprises carrier means arranged to be displaceable along said carrier beam and fixedly adjustable thereon.

13. An apparatus as claimed in claim 11, further comprising a pivotable shaft extending substantialy across the entire width of the apparatus, a plurality of resilient means connecting said shaft to each of said pairs of clamp faces, respectively, and drive means arranged to pivot said shaft, whereby said clamp faces are jointly movable by a pivoting movement of said shaft.

* * * * *